United States Patent [19]

Kawai et al.

[11] Patent Number: 4,726,248
[45] Date of Patent: Feb. 23, 1988

[54] MASTER MANIPULATOR

[75] Inventors: Seiji Kawai, Ogaki; Norio Ozawa, Tokyo, both of Japan

[73] Assignees: Kabushiki Kaisha Meidensha; Doryokuro Kakunenryo Kaihatsu Jigyodan, both of Tokyo, Japan

[21] Appl. No.: 851,716

[22] Filed: Apr. 14, 1986

[30] Foreign Application Priority Data

Apr. 17, 1985 [JP] Japan ................................ 60-81573

[51] Int. Cl.⁴ .............................................. G05G 9/02
[52] U.S. Cl. .................................... 74/471 XY; 74/523
[58] Field of Search .............. 74/471 R, 471 XY, 523, 74/491

[56] References Cited

U.S. PATENT DOCUMENTS

| | | | |
|---|---|---|---|
| 2,549,969 | 4/1951 | Hesemann | 74/471 |
| 3,171,549 | 3/1965 | Orloff | 214/1 |
| 3,608,743 | 9/1971 | Mosher et al. | 214/1 CM |
| 4,187,737 | 2/1980 | Mori et al. | 74/471 XY |
| 4,374,600 | 2/1983 | van Zelm | 294/19 R |

FOREIGN PATENT DOCUMENTS 1537663 7/1968 France .
1324400 7/1973 United Kingdom .

Primary Examiner—Allan D. Herrmann
Attorney, Agent, or Firm—Bachman & LaPointe

[57] ABSTRACT

When an operator moves the grip member in the first bending direction x or in the second bending direction y or in the third twisting direction z, the three motions are detected by three sensing means independently to drive a slave manipulator in the same way. The master manipulator comprises four members of a first lever pivotable around the axis X, a second lever pivotable around the axis Y, a connecting member, and a link member, which forms a transformable parallelogram with three universal joints as joints. To detect only the third twisting motion z, the above mechanism may be sufficient. However, to detect other two bending motions x and y simultaneously, the master manipulator is further provided with a bending motion transform assembly and a spherical bearing assembly. In the bending motions x and y, a parallelogram is formed, in particular, with the spherical bearing disposed near the third universal joint as joint, and the two motions x and y of the link member are detected by way of the transform assembly.

4 Claims, 4 Drawing Figures

FIG. 1A
FIG. 1B
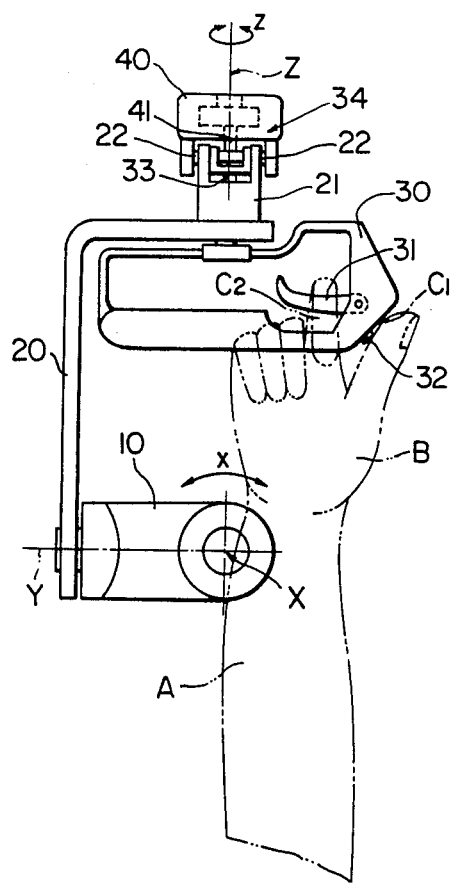
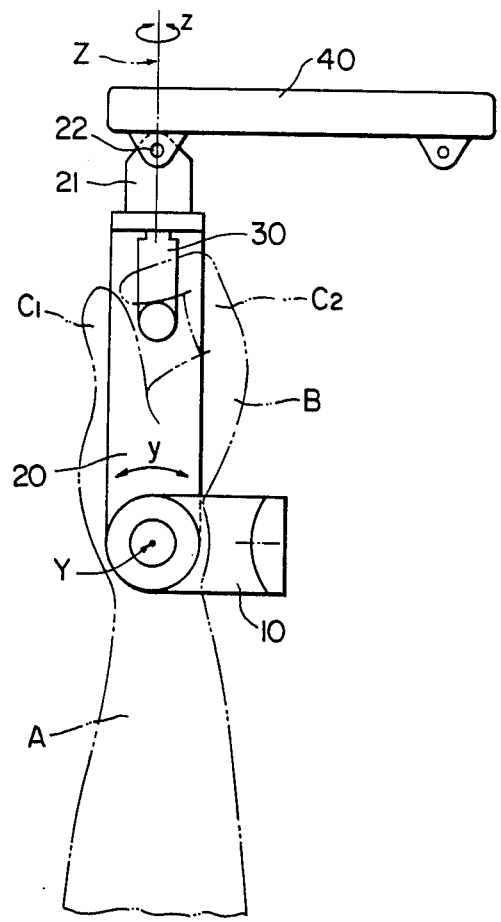

_ _

MASTER MANIPULATOR

BACKGROUND OF THE INVENTION

1. Field of the Invention

The present invention relates generally to a master manipulator of a master-slave type manipulator, in which when an operator operates the master manipulator, a slave manupulator accurately moves in accordance with the movement of the master manipulator. The manipulator of this type is used to perform some work or operations from the outside of a space in which a worker or an operator cannot enter because of a dangerous situation for some reason or other.

2. Description of the Prior Art

In some dangerous spaces, compartments or establishment as in atomic energy facilities, an operator cannot enter thereinto to perform some work or operations, because of the radioactive atmosphere. When something is required to move from the outside in such a radioactive space as described, a master-slave type manipulator is used. In this manipulator, when an operator operates a master manipulator outside the radioactive atmosphere, a slave manipulator disposed inside the radioactive atmosphere is moved in accordance with the movement of the master manipulator in order to perform necessary work or operations. The master manipulator of this type is usually provided with a grip member mounted on an arm member. The operator can operate the grip member by bending or twisting his hand about or near the wrist. The above operator hand motions are usually a vertical hand bending motion, a horizontal hand bending motion and a hand twisting motion.

In the prior-art master manipulator, however, the members for the vertical hand bending motion, the horizontal hand bending motion and the hand twisting motion are not arranged collectively but arranged on a straight line and therefore the motional directions of the master manipulator does not match those of the operator wrist. In other words, there exits a problem in that the grip motion or the operator hand wrist motion of the operator is not intuitive in relation to the motion of the slave manipulator. In addition, there exists other drawbacks such that the weight and the inertia of the grip member are relatively great to smoothly operate the manipulator and also the space of the grip member within which the operator hand is placed is relatively small to comfortably operate the manipulator.

SUMMARY OF THE INVENTION

With these problems in mind, therefore, it is the primary object of the present invention to provide a master manipulator in which the three members for vertical hand bending motion, the horizontal hand bending motion and the hand twisting motion are arranged collectively so that the operator can smoothly operate the manipulator in accordance with the operator intuitive motions.

To achieve the above-mentioned object, the master manipulator according to the present invention comprises (a) an arm member in parallel to which the operator hand is placed; (b) a first lever member mounted on said arm member and pivotable in a direction of a first operator hand bending motion x about an axis X perpendicular to a longitudinal direction of said arm member; (c) a second lever member mounted on said first lever member and pivotable in a direction of a second operator hand bending motion y about an axis Y perpendicular to the axis X; (d) a grip member mounted on said second lever member and pivotable in a direction of a third operator hand twisting motion z about an axis Z perpendicular to the axes X and Y, the three axes X, Y. Z intersecting each other at a single point; (e) a connecting member connected to said grip member via a first universal joint at one end thereof; (f) a link member connected to the other end of said connecting member via a second universal joint at one end thereof; (g) a double spherical bearing universal bending motion transform assembly slidably and pivotably connected to the other end of said link member and having a first projection, a second projection and a third projection, (h) a single spherical bearing assembly mounted on said arm member for pivotably mounting the two third projections of said double spherical bearing bending motion transform assembly; (i) a first motion sensing and controlling means connected to the first projection of said double spherical bearing bending motion transform assembly, for detecting the first operator hand bending motion x; (j) a second motion sensing and controlling means connected to the second projection of said double spherical bearing bending motion transform assembly, for detecting the second operator hand bending motion y; and (k) a third motion sensing and controlling means supported by said single spherical bearing assembly and connected to said double spherical bearing bending motion transform assembly via a third universal joint for detecting the third operator hand twisting motion z.

In the manipulator according to the present invention, when said grip member is moved in the first operator hand bending direction x, a parallelogram formed by said first lever member, said second lever member, said connecting member, said link member and said double spherical bearing bending motion transform assembly with the first and second universal joints, said single spherical bearing assembly and the axis X as joints is transformed to transmit the first bending motion x of said grip member to the first projection of said double spherical bearing bending motion transform assembly. The movement of the first projection is detected by the first motion sensing and controlling means to generate command signals corresponding thereto to the slave manipulator.

When said grip member is moved in the second operator hand bending direction y, the parallelogram formed by the above five members with the first and second universal joints, said single spherical bearing assembly and the axis Y as joints is transformed to transmit the second bending motion y of said grip member to the second projection of said double spherical bearing bending motion transform assembly. The movement of the second projection is detected by the second motion sensing and controlling means to generate command signals corresponding thereto to the salve manipulator.

When said grip member is twisted in the third operator hand twisting direction z, the twist motion of said grip member is transmitted from said grip member to said third motion sensing and controlling means via the first, second and third universal joints assembly. The rotational movement of the third twisting motion is detected by the third motion sensing and controlling means to generate command signals corresponding thereto to the slave manipulator.

Here, the following point should be noted to facilitate understanding of the operation of the master manipulator according to the present invention: If only the third hand twisting motion z is required to detect, the above rather complicated double spherical bearing bending motion transform assembly is unnecessary. This is because the twisting motion z can be transmitted from the grip member to the third motion sensing and controlling means via a first, second and third universal joints. The above bending moition transform assembly is provided to detect two bending motions x and y simultaneously. Here, the pivotal center of this transform assembly should ideally be located at the third universal joint. However, this is impossible in practice, and so the single bearing assembly about which the transform assembly is pivoted in either direction is located as near as possible the third universal joint.

Since the axes X, Y, Z of the three motions x, y and z accurately intersect each other at a single point on the grip member side and at roughly a single point on the motion sensing and controlling means side as is the case of human hand, it is possible to detect the three human hand motions x, y, z intuitively by the three sensing means separately.

BRIEF DESCRIPTION OF THE DRAWINGS

The features and advantages of the master manipulation according to the present invention will be more clearly appreciated from the following description taken in conjunction with the accompanying drawings in which like reference numerals designate the same elements or sections throughout the figure thereof and in which:

FIG. 1A is a side view showing only the grip mechanism of the master manipulator according to the present invention;

FIG. 1B is a top view showing only the grip mechanism of the master manipulator according to the present invention;

DETAILED DESCRIPTION OF THE PREFERRED EMBODIMENT

Figure 2A:
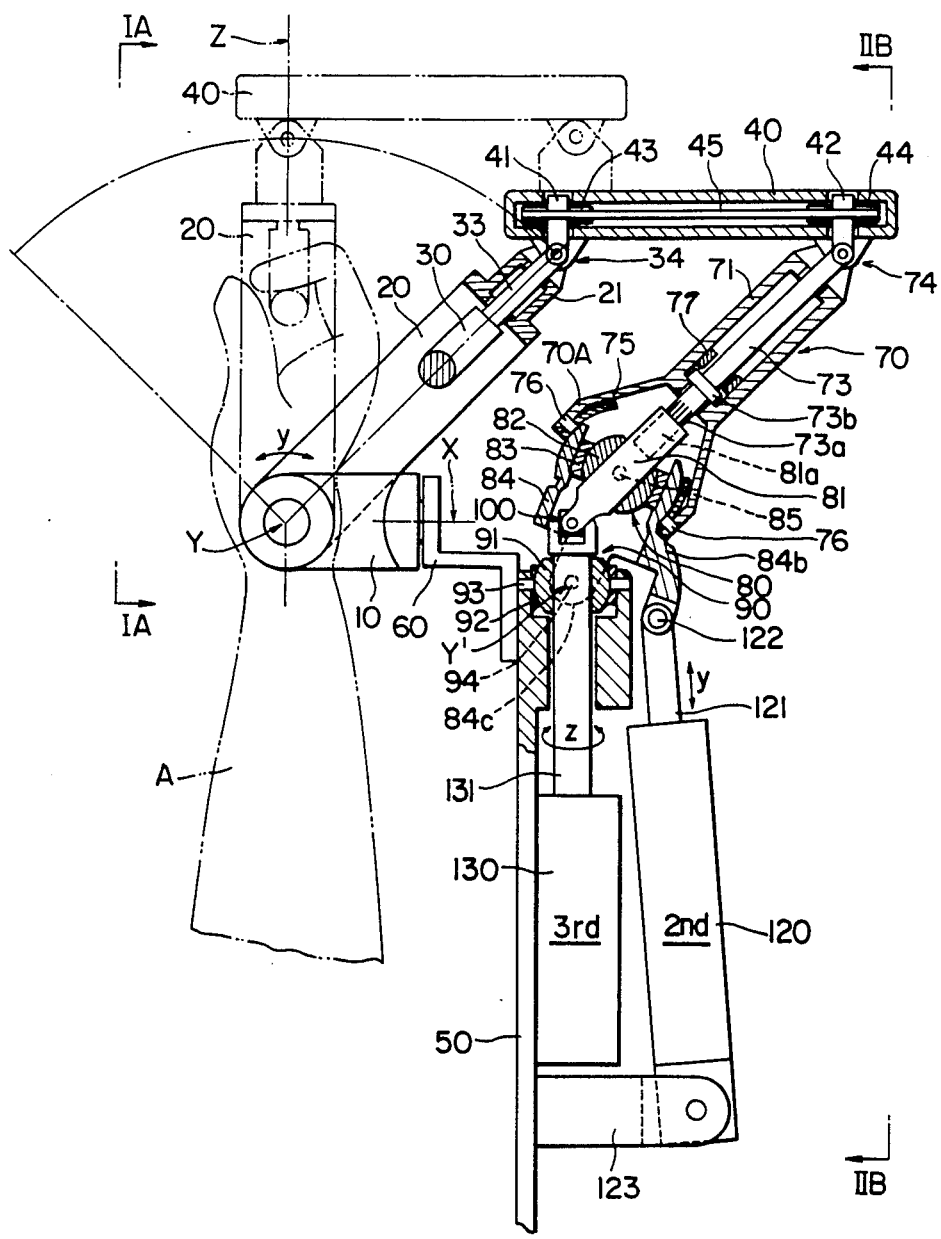
FIG. 2A is a top view, partly in cross section, of the master manipulator according to the present invention.

With reference to the attached drawing, an embodiment of the master manipulator according to the present invention will be described hereinbelow.

FIGS. 1A and 1B show only the grip mechanism operated by an operator, for facilitating understanding of the operation and movements of the master manipulator. In the drawings, the grip mechanism is composed of a first L-shaped lever member 10 pivotable with the axis X as its center, a second L-shaped lever member 20 pivotable with the axis Y as its center on the first L-shaped lever member 10, a roughly rectangular grip member 30 pivotable with the axis Z as it center on the second L-shaped lever member 20, and a connecting member 40 movable relative to the second L-shaped lever member 20 via a universal joint 34.

The grip member 30 is provided with a swtich lever 31 and a switch button 32 for generating various commands to a slave manipulator when depressed by the operator. In normal operation, the thumb C1 of the operator is placed on the switch button 32 and the forefinger C2 thereof is engaged with the switch lever 31 when the operator grips the grip member 30. The arm A of the operator is placed roughly in parallel with the second L-shaped lever member 20.

The grip member 30 is provided with a grip member shaft 33 pivotably supported within a cylindrical member 21 fixed to the second L-shaped lever member 20. The end of the cylindrical member 21 is connected to two brackets of the connecting member 40 by two pins 22. The shaft 33 is connected to another shaft 41 of the connecting member 40 via a first universal joint 34 so as to transmit a twist motion from the grip member shaft 33 to the connecting member shaft 41.

When the operator hand B is bent up and down in FIG. 1B as shown by the arrow x in FIG. 1A (referred to as the first vertical hand bending motion x), the first L-shaped lever member 10 and the second L-shaped lever member 20 are pivoted with the axis X as its center. When the operator hand B is bent right and left as shown by the arrow y in FIG. 1B (referred to as the second horizontal hand bending motion y), the second L-shaped lever member 20 is pivoted with the axis Y as its center. When the operator arm A or the hand B is twisted as shown by the arrow z in FIGS. 1A or 1B (referred to as the third hand twisting motion z), the grip member shaft 33 is pivoted together with the grip member 30. Here, it should be noted that the above three axes X, Y and Z intersect each other at a single intersection point.

The above three motions x, y and z of the grip member 30 are transmitted to three sending means as accurately as possible to generate various command signals to the slave manipulator (not shown).

Figure 2B:
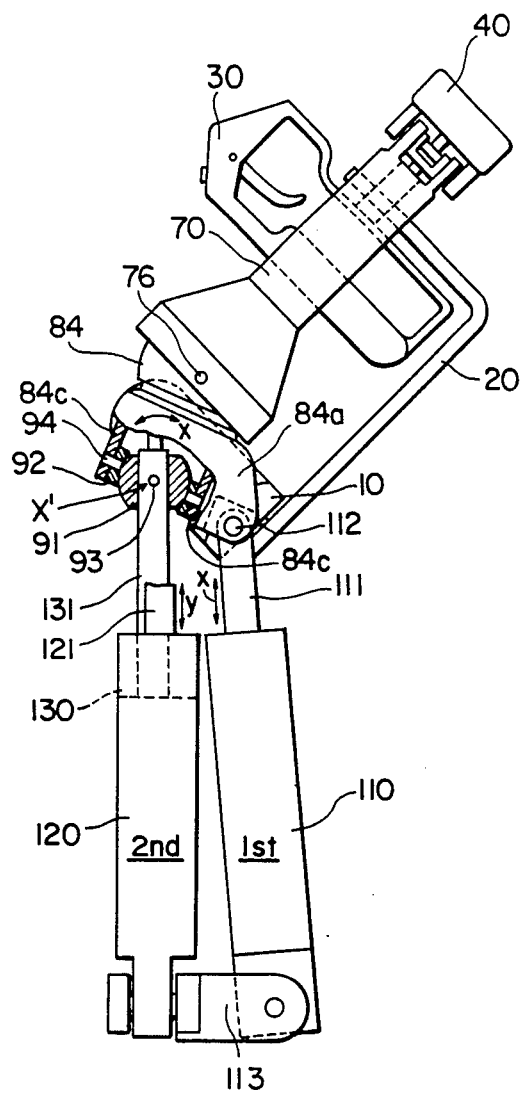
FIG. 2B is a side view of the master manipulator according to the present invention.

With reference to FIGS. 2A and 2B, the whole master manipulator will be described hereinbelow. In the drawings, in addition to the grip mechanism, the master manipulator roughly comprises an arm member 50 in parallel to which the operator arm A is placed to operate the master manipulator, a third L-haped fixed base member 60 fixed to the arm member 50, a cylindrical link member 70, a double spherical bearing bending motion transform assembly 80, a single spherical bearing assembly 90, and three motion sensing and controlling means 110, 120 and 130.

On the L-shaped fixed base member 60, the already-mentioned grip mechanism including 10, 20, 30 and 40 is pivotably mounted. The cylindrical link member 70 is pivotably connected to the connecting member 40 via a second universal joint 74 similar to that 34 so as to form a parallelogram in cooperation with the first L-shaped lever member 10, the second L-shaped lever member 20, the connecting member 40, and the third L-shaped base member 60. Therefore, when this parallelogram is pivoted by the operator hand about the axis X, the vertical hand bending motion x is detected by the first motion sensing and controlling means 110 (see FIG. 2B); when pivoted about the axis Y, the horizontal hand bending motion y is detected by the second motion sensing and controlling means 120 (see FIG. 2A); when the grip member 30 is twisted with the parallelogram as it is by the operator hand about the axis z, the hand twisting motion z is detected by the third motion sensing and controlling means 130 (see FIG. 2A).

With reference to FIGS. 2A and 2B, the pivotal motion transmitting mechanism including connecting member 40, the link member 70, the double spherical bearing bending motion transform assembly 80, the single spherical bearing assembly 90, and three motion sensing and controlling means 110, 120 and 130 will be described in more detail herein above.

Here, it should be noted that if only the twisting motion z is required to detect, the above double spherical bearing bending motion transform assembly 80, and the single spherical bearing assembly 90 are both unnecessary. In other word, these two assemblies 80 and 90 are provided for detecting the bending motions x and y simultaneously. Further, in ideal the bending transform assembly 80 should be pivoted about the axis of a third universal joint 100. However, since it is difficult to realize this condition in plactice, the two pivotal centers of the bending transform assembly 80 are arranged just under the third universal joint 100; that is, the assembly 80 is pivotable by means of the single spherical bearing assembly 90 in both the directions x and y.

As already mentioned, the grip member shaft 33 is connected to the first connecting member shaft 41 via the first universal joint 34. A first pulley 43 is fixed to the first connecting member shaft 41.

A link member shaft 73 is also pivotably supported by a housing 71 of the link member 70. This link member shaft 73 is formed with an axial male spline portion 73a at one end thereof and a flange portion 73b at the medium portion thereof. The link member shaft 73 is movably housed within the link member housing 71. A stopper ring 77 is fixed to the inner surface of the link member housing 71 to limit the axial movement of the link member shaft 73 in cooperation with the flange portion 73b of the link member shaft 73. Similarly, the link member shaft 73 is connected to a second connecting member shaft 42 of the connecting member 40 via a second universal joint 74 at the other end thereof. A second pulley 44 is fixed to the second connecting member shaft 42. A belt 45 is reeved between the two pulleys 43 and 44. The belt 45 and the two pulleys 43 and 44 can be replaced with a chain and two sprockets, where required.

The link member 70 is formed with a roughly conical portion 70A at the lower end thereof. A truncated hemispherical hollow slidable member 75 is pivotably connected to the inner surface of the conical portion 70A via two pins 76 as shown in FIG. 2A, so as to be pivotable relative to the conical portion 70A about the pins 76 in the first vertical hand bending motion x, as depicted in FIG. 2B. Further, this truncated slidable member 75 is pivotable about two pins 85 fixed to a joint cover 84 (described later) in the second horizontal hand bending motion y, as depicted in FIG. 2A.

The double spherical bearing bending motion transform assembly 80 comprises a joint shaft 81, a first male spherical bearing 82, a first femal spherical bearing 83, and a joint cover 84.

The joint shaft 81 is formed with a female spline 81a engageable with the male spline 73a of the link shaft 73 as as to be axially movable. In place of these two splines 73a and 81a, it is also possible to provide an elastic member between the link member 70 and the double spherical bearing bending motion transform assembly 80. The first male spherical bearing 82 is pivotably and slidably fitted to the joint shaft 81. The first female spherical bearing 83 is fixed to the inner surface of the joint cover 84 so as to be engageable with the first male spherical bearing 82.

Here, it should be noted that the truncated semispherical slidable member 75 is pivotably supported on the inner surface of the conical portion 70A of the link member 70 by two separate pins 76 fixed to the conical portion 70A, as already described, and further pivotably supported on the outer surface of the joint cover 84 by two separate pins 85 fixed to the joint cover 84 as shown in FIG. 2A. Therefore, the link member 70 is pivoted with the inner surface of the truncated semispherical slidable member 75 in contact with the outer surface of the joint cover 84 about the two pins 85 in the case of the second horizontal hand bending motion y.

Under these conditions, if the truncated slidable member 75 is further pivoted in the first vertical hand bending motion x, the truncated slidable member 75 is pivoted relative to the conical portion 70A about the two pins 76 in contact with the joint cover 84. The above double spherical bearing bending motion assembly 80 functions as a universal joint between the link member 70 and the arm member 50.

The joint cover 84 is formed with a first projection 84a, a second porjection 84b, and two third projection 84c. The two third projection 84c are formed an angular interval of 180° apart from each other, as shown in FIG. 2B. The second projection 84b is formed between two third projections 84c as shown in FIG. 2A. Further, the first projection 84a is formed an angular interval of 90° apart from the second projection 84b as shown in FIG. 2B.

The single spherical bearing assembly 90 comprises a second male spherical bearing 91, and a second female spherical bearing 92. The second female spherical bearing 92 is pivotally supported by two pins 93 fixed to the arm member 50 in parallel with the axis X so as to be engageable with the second male spherical bearing 91. The above single spherical bearing assembly 90 also functions as a universal joint. Here, it should be noted that the two third projections 84c of the joint cover 84 are pivotably supported by two pins 94 fixed to the second female bearing 92 in parallel with the axis Y and perpendicular to the pins 93 in such a way as to sandwich the second female bearing 92 engaged with the second male bearing 91. Therefore, the joint cover 84 can be pivoted in either direction about a center at which two pins 93 and 94 intersect each other. In more detail, the joint cover 84 is pivoted about the pins 93 in the first vertical bending motion x and about the pins 94 in the second horizontal bending motion y because the third projections 84c are pivotably connected to the second female bearing 92.

The first motion sensing and controlling means 110 includes a first slidable shaft 111 connected to the first projection 84a of the joint cover 84 via pin 112. The second motion sensing and controlling means 120 includes a second slidable shaft 121 connected to the second projection 84b of the joint cover 84 via a pin 122. The third motion sensing and controlling means 130 includes a third pivotable shaft 131 connected to the joint shaft 81 via a third universal joint 100. Further, in FIG. 2B, the numeral 113 denotes a stay for supporting the first motion sensing and controlling means 110, and in FIG. 2A the numeral 123 denotes a stay for supporting the second motion sensing and controlling means 120.

The first and second motion sensing and controlling means 110 and 120 comprise a first sensor for detecting the motion distance and a second sensor for detecting the motion velocity. The third motion sensing and controlling means 130 comprises a first sensor for detecting the an angular distance and a second sensor for detecting the angular velocity. The above various detected signals are supplied to a slave manipulator (not shown)

for driving various servo systems (not shown). In addition, various signals indicative of reactive forces of the slave manipulator are feedbacked to the three sensing and controlling means 110, 120, and 130 to transmit the reactive forces to the operator. For these purposes, each sensing and controlling means 110, 120, or 130 comprises a motor, a reduction gear, a reversible ball screws, etc. in addition to the distance and velocity sensors.

The operation of the master manipulator according to the present invention will be described in terms of various degrees of motion freedom.

(1) Vertical hand bending motion x around axis X:

When the operator hand A griping the grip member 30 is bent in the direction x about the axis X, the first L-shaped lever member 10 is pivoted in the same direction x. Since a parallelogram is formed by the first lever member 10, the second lever member 20, the connecting member 40, and the link member 70 and further the above four members 10, 20, 40, and 70 are connected by the first universal joint 34, the second universal joint 74, and the bending motion transform assembly 80 respectively, as shown in FIG. 2A, the link member 70 is pivoted in the same direction x by the same angle as that of the first lever member 10 with the pins 76 as its center. When the link member 70 is pivoted about the pins 76, the male spline 73a of the link member shaft 73 slides relative to the female spline 81a of the joint shaft 81. In the case shown in FIG. 2B, since the male spline 73a enters into the female spline 81a, the conical portion 70A of the link member 70 is pivoted about the pins 76 with the truncated semispherical slidable member 75 kept in contact with the outer surface of the joint cover 84, so that the edge of the conical portion 70A is brought into contact with the top surface of the first projection 84a of the joint cover 84 to move the joint cover 84 clockwise, for instance, in FIG. 2B about the pins 93. Therefore, the first slidable shaft 111 is moved downward into the first motion sensing and controlling means 110, so that the distance and the speed of the first vertical hand bending motion x can be detected by the sensors housed therein.

(2) Horizontal hand bending motion y around axis Y:

When the hand A griping the grip member 30 is bent in the direction y around the axis Y, the second L-shaped lever member 20 is pivoted in the same direction y. In the same way, since the parallelogram is formed by the four members 10, 20, 40 and 70, and further the above four members are connected by two universal joints 34 and 73, and bending motion transform assembly 80, the link member 70 is pivoted in the same direction y by the same angle as that of the second lever member 20 with the pins 85 as its center. When the link member 70 is pivoted about the pins 85, the male spline 73a of the link member shaft 73 slides into the female spline 81a of the joint shaft 81, so that the conical portion 70A of the link member 70 or the truncated semispherical slidable member 75 is pivoted about the pin 85 and therefore the edge of the conical portion 70A is brought into contact with the top surface of the second projection 84b of the joint cover 84 to move the joint cover 84 clockwise, for instance, in FIG. 2A around the pin 94. Therefore, the second slidable shaft 122 is moved downward into the second motion sensing and controlling means 120, so that the distance and the speed of the horizontal hand bending motion y are detected by the sensors housed therein. (3) Hand twisting motion z around axis Z:

When the hand A griping the grip member 30 is twisted in the direction z about the axis Z, the twisting moment is transmitted from the grip member 30 to the third motion sensing and controlling member 130 by way of the grip member shaft 33, the first universal joint 34, the first connecting member shaft 41, the first pulley 43, the belt 45, the second pulley 44, the second connecting member shaft 42, the second universal joint 74, the link member shaft 73, the joint shaft 81, the third universal joint 100, and the third slidable shaft 131. Therefore, the third slidable shaft 131 is pivoted within the third motion sensing and controlling means 130, so that the angular distance and the angular speed of the hand twisting motion z are detected by the sensors housed therein.

In the above-mentioned operation, the following point should be noted: under the condition that the link member 70 is fixed to the link cover 84, the link member 70 can ideally be pivoted about the third universal joint 100 arranged at one point of intersections of the parallelogram in only the case of the first hand bending motion x or the second hand bending motion y. However, in the case of two first and second hand bending motions x and y in combination, the ideal joint point of the third universal joint 100 is to be shifted to the pins 93 in the case of the first hand bending motion x and to the pins 94 in the case of the second hand bending motion y. In ideal, the three axes X', Y' and Z' of the three hand motions x, y, and z should be intersected to each other at a single point as in the human hand even on the sensing means side. However, it is impossible to realize this ideal condition in the manipulator mechanism, because it is impossible to detect the two motions x and y of the link member 70 by two fixed sensing means. Further, when the sensing means are movably disposed, the inertia of the manipulator is inevitably increased. In the master manipulator according to the present invention, the motion x and y of the link member 70 are detected through the motion transform assembly 80 in such a way that the pivotable points (pins 94 and 93) are a little shifted away from the ideal single joint point (the third universal joint 100). Although the link member 70 is simply twisted about the third universal joint 100 in the case of the third hand twisting motion z, since the link member 70 is pivoted about the two pins 94 or 93 in the first and second hand bending motions x and y, the rather complicated double spherical bearing bending motion transform assembly 80 and the single spherical bearing 90 are disposed near the third universal joint 100. In this assembly 80, the joint cover 84 is slidably connected to the link member 70 in such a way that the truncated semispherical sliding member 75 pivotable about the pins 76 is further slidable on the outer surface of the joint cover 84 about the pins 85. In the sliding motion of these two members 75 and 84, the first male spherical bearing 82 slides along the outer surface of the joint shaft 81 and further the joint shaft 81 slides axially relative to the link member shaft 73 via the male and female splines 81a and 73a in order to absorb the mutual mismatching motion distance between two members 75 and 84 caused by the two hand bending motions x and y about the pins 94 and 93, that is, an offset from the ideal point of the third universal joint 100.

The above three hand motions x, y and z are all independent from each other in the master manipulator according to the present invention and detected by the three sensing means separately. The detected motions are transmitted to a slave manipulator in the form of command signals to drive various servo systems so that the slave manipulator can be driven in the same way as the master manipulator. As already described, when the sensing and controlling means 110, 110, and 120 include a reduction gear, a motor, a reversible threaded member, etc., it is also possible to feedback the reaction forces of the slave manipulator to the master manipulator so that the operator can sense the actual feeling of the slave manipulator. The above sensing and controlling system is called bilateral control method.

In the above description, the hand twisting motion z is transmitted to the third sensing and controlling member 130 through five shaft members 33, 41, 42, 73, 81, the belt 45, and three universal joints 34, 74 and 100. However, without being limited to this arrangement, it is possible to use a flexible wire in place of the shafts, belts, and the universal joints.

As described above, in the master manipulator according to the present invention, since the three axes X, Y and Z of the three motions x, y and z of the grip member 30 intersect each other at a single point on the grip member side, the second L-shaped lever member 20 and the link member 70 are pivoted while forming a parallelogram in cooperation with the connecting member 40 and the first and third lever members 10 and 60. Further since the bending motion transform assembly 80 is pivoted about the pins 94 and 93 near the ideal joint point 100 on the motion sensing means side, it is possible to accurately detect the three motions of the operator hand independently and intuitively. Further, since the three sensing and controlling means are arranged on the arm member 50, the inertia of the moving members can be reduced, thus improving the operability.

What is claimed is:

1. A master manipulator for generating grip motion command signals to move a slave manipulator in accordance with motions of an operator hand, which comprises:
   (a) an arm member in parallel to which the operator hand is placed;
   (b) a first lever member mounted on said arm member and pivotable in a direction of a first operator hand bending motion x about an axis X perpendicular to a longitudinal direction of said arm member;
   (c) a second lever member mounted on said first lever member and pivotable in a direction of a second operator hand bending motion y about an axis Y perpendicular to the axis X;
   (d) a grip member mounted on said second lever member and pivotable in a direction of a third operator hand twisting motion z about an axis Z perpendicular to the axes X and Y, the three axes X, Y, Z intersecting each other at a single point;
   (e) a connecting member connected to said grip member via a first universal joint at one end thereof;
   (f) a link member connected to the other end of said connecting member via a second universal joint at one end thereof;
   (g) a double spherical bearing bending motion transform assembly slidably and pivotably connected to the other end of said link member and having a first projection, a second projection and a third projection;
   (h) a single spherical bearing assembly mounted on said arm member for pivotably mounting the third projection of said double spherical bearing bending motion transform assembly;
   (i) a first motion sensing and controlling means connected to the first projection of said double spherical bearing bending motion transform assembly, for detecting the first operator hand bending motion x;
   (j) a second motion sensing and controlling means connected to the second projection of said double spherical bearing bending motion transform assembly, for detecting the second operator hand bending motion y; and
   (k) a third motion sensing and controlling means supported by said single spherical bearing assembly and connected to said double spherical bearing bending motion transform assembly via a third universal joint for detecting the third operator hand twisting motion z; and
   (l) when said grip member is moved in the first operator hand bending direction x, a parallelogram formed by said first lever member, said second lever member, said connecting member, said link member and said double spherical bearing bending motion transform assembly with the first and second universal joints, said single spherical bearing assembly and the axis X as joints being transformed to transmit the first bending motion x of said grip member to the first projection of said double spherical bearing bending motion transform assembly;
   when said grip member is moved in the second operator hand bending direction y, the parallelogram formed by the above five members with the first and second universal joints, said single spherical bearing assembly and the axis Y as joints being transformed to transmit the second bending motion y of said grip member to the second projection of said double spherical bearing bending motion transform assembly; and
   when said grip member is twisted in the third operator hand twisting direction z, the twist motion of said grip member being transmitted from said grip member to said third motion sensing and controlling means via the first, second and third universal joints.

2. The master manipulator as set forth in claim 1, wherein said link member comprises:
   (a) a cylindrical housing;
   (b) a link member shaft having a male spline at one end thereof remote from the second universal joint and housed within said cylindrical housing; and
   (c) a truncated semispherical hollow slidable member pivotably supported by two pins on an inside surface of a conical aportion of said cylindrical housing so as to be pivotable in the first bending motion direction x.

3. The master manipulator as set forth in claim 2, wherein said double spherical bearing bending motion transform assembly comprises:
   (a) a joint shaft having a female spline engageable with the male spline of said link member shaft at one end remote from the third universal joint;
   (b) a first male spherical bearing slidably fitted to the joint shaft;
   (c) a joint cover formed with the first projection, the second projection and the two third projections, an outer spherical surface of said joint cover being engaged with an inner surface of said truncated semispherical hollow slidable member, said link member being pivoted about the two pins fixed to the conical portion in the first bending motion direction x and the truncated slidable member being pivoted along the outer surface of said joint cover about two pins fixed to the joint cover so as to be pivotable in the second bending motion direction y; and (d) a first female spherical bearing fixed to an inner cylindrical surface of said joint cover so as to be engageable with the first male spherical bearing.

4. The master manipulator as set forth in claim 3, wherein said single spherical bearing assembly comprises:

(a) a second male spherical bearing fixed to said third motion sensing and controlling means; and (b) a second female spherical bearing engaged with said male spherical bearing and pivotably supported by two pins fixed to said arm member, the third projections of said joint cover supported by two pins fixed to the second female spherical bearing being pivotable about the pins in the first bending motion direction x and about the pins in the second bending motion direction y.

* * * * *